United States Patent [19]
Baars

[11] 3,857,100
[45] Dec. 24, 1974

[54] ELECTRONIC SWITCHING ARRANGEMENT HAVING A TOUCH CONTACT

[75] Inventor: Nicolaas Joris Baars, Emmasingel, Eindhoven, Netherlands

[73] Assignee: U.S. Philips Corporation, New York, N.Y.

[22] Filed: Mar. 23, 1973

[21] Appl. No.: 344,265

[30] Foreign Application Priority Data

Apr. 14, 1972 Netherlands ....................... 7204999

[52] U.S. Cl. ................. 328/5, 307/116, 340/258 C, 340/365 C, 307/308

[51] Int. Cl. .......................................... H01h 35/00

[58] Field of Search ....... 200/DIG. 1; 307/118, 116, 307/308; 317/DIG. 1, DIG. 2; 340/365 C, 258 C; 328/5; 331/65

[56] References Cited

UNITED STATES PATENTS

| | | | |
|---|---|---|---|
| 3,271,878 | 9/1966 | Martin | 307/118 |
| 3,492,440 | 1/1970 | Cerbone et al. | 200/DIG. 1 |
| 3,603,805 | 9/1971 | Apel | 307/118 |
| 3,710,138 | 1/1973 | Cotton | 317/DIG. 3 X |

OTHER PUBLICATIONS

Taub, Touch Button Circuit, IBM Tech. Discl. Bulletin, July, 1966, pp. 205–206

Nick, "Touch-Sensitive Circuits," IBM Technical Disclosure Bulletin, Sept., 1963, p. 135

*Primary Examiner*—Robert K. Schaefer
*Assistant Examiner*—William J. Smith
*Attorney, Agent, or Firm*—Frank R. Trifari; Henry I. Steckler

[57] ABSTRACT

An electronic switching arrangement having a touch contact particularly for switching preselected channels in radio or television receivers. The alternating voltage which occurs across the contact when it is touched is rectified in a rectifier having such a long charge time constant that switching over is effected after a plurality of cycles of the alternating voltage.

5 Claims, 4 Drawing Figures

ELECTRONIC SWITCHING ARRANGEMENT HAVING A TOUCH CONTACT

The invention relates to an electronic switching arrangement having a touch contact, a bistable switching element having a control input, a coupling between the touch contact and the control input, and an alternating voltage source which is activated when the touch contact is touched for switching over the switching element.

Electronic switching arrangements having a touch contact are increasingly being used, for example, for channel switching in television or radio-receivers, for switching the tape speed or rotational speed in tape recorders or record players, for operating elevators, as light switches etc. In many cases an alternating voltage is used, for example, the alternating voltage from the mains which upon touching the touch contact is applied to the control input of a bistable switching element and causes the switching element to switch over. Generally the switching element remains in its new state after the touch contact is released, and it switches back again when another switching element is switched on as a result of touching another touch contact or when the first contact is touched once more.

A drawback increasingly occurring in the above-mentioned arrangement is that due to the increasing use of synthetic materials in clothing, floor carpets, etc., electrostatic charges are easily produced across the touch contact which must necessarily be accessible easily. As a result unwanted switch-over of the switching element occurs.

A conventional method of preventing perturbations due to discharges is the use of filters which pass the desired frequency but stop the perturbations. Particularly for the commonly used low mains frequency, such a filter is, however, expensive and moreover it weakens the desired signal.

An object of the invention is to provide a switching arrangement of the kind described above which is cheap and quite insensitive to perturbations and to this end the arrangement according to the invention is characterized in that the said coupling comprises a rectifier circuit having a charge capacitor for rectifying the alternating voltage, while the charge time constant of the rectifier circuit is essentially longer than one cycle of the alternating voltage.

The invention will be further described with reference to the Figures shown in the drawings.

Figure 1:
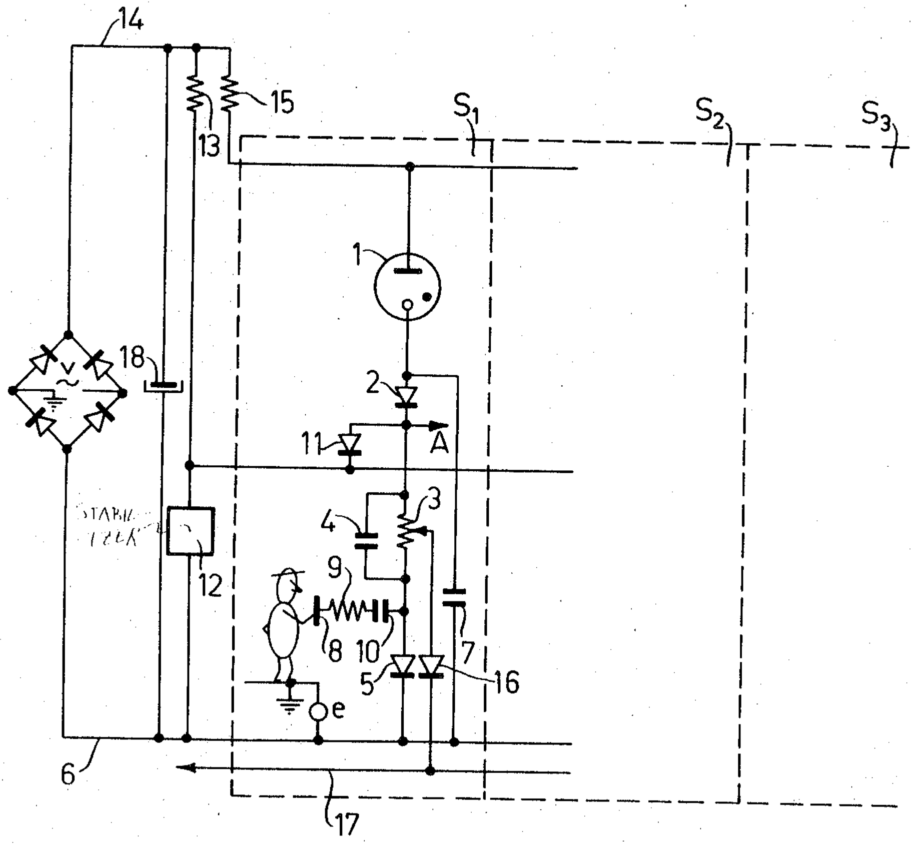
FIG. 1 shows a first embodiment of an arrangement according to the invention.

FIG. 1 shows a number of identical switching units $S_1$, $S_2$, $S_3$, etc. of which only the unit $S_1$ is shown in detail. Each unit includes a gas-filled tube 1 operating as a switching element whose cathode is connected to the negative terminal 6 of a voltage supply source V through a diode 2, a potentiometer 3 and a parallel-arranged capacitor 4 and subsequently through a diode 5; in addition a capacitor 7 is connected between the cathode of the tube 1 and the negative terminal 6. A touch contact 8 is connected through a resistor 9 and a capacitor 10 to the connection between the diode 5 and the potentiometer 3. A diode 11 connects the high end of the potentiometer 3 to a voltage stabilizer 12 which is common for all switching units and which is fed from the positive terminal 14 of the voltage supply source V through a resistor 13. A capacitor 18 serves for smoothing the supply voltage. The anode of the tube 1 is connected to said positive terminal 14 through a resistor 15 which is likewise common for all switching units. A blocking diode 16 connects the tap of the potentiometer 3 to a connection 17 which is common for all switching units and which leads to capacity diodes not further shown with which the radio or television receiver is tuned in known manner.

The operation of the arrangement of FIG. 1 is as follows.

The resistor 15 which is located in the common anode leads of all tubes 1 is proportioned in such a manner that only one of these tubes will conduct. Let it be assumed that, for example, the tube in the unit $S_2$ conducts. The tube in the unit $S_1$ and those in the other units consequently do not conduct.

If the touch contact 8 in the unit $S_1$ is touched by an operator, a capacitve and/or resistive connection between the touch contact 8 and earth is produced through this operator's body. An alternating voltage source which is denoted by *e* in FIG. 1 is present between earth and the negative terminal 6 of the voltage supply source V and the alternating voltage source *e* is connected by touching of the contact 8 between this contact and the negative terminal of the voltage supply source through the said capacitive and/or resistive connection.

It is to be noted that in the arrangement of FIG. 1 the alternating voltage source *e* is shown separately only for the sake of clarity, but it is actually constituted by the structure of the voltage supply source V. This source consists of a four-diode bridge rectifier having the mains voltage applied to one of its diagonals while the other diagonal is constituted by the terminals 14 and 6. In such a bridge rectifier approximately half the mains voltage is present across each diode. Since one side of the mains voltage is connected to earth, approximately half the mains voltage is always present across the negative terminal 6 and ground independent of the fact which side of the mains voltage is connected to earth.

Figure 2:
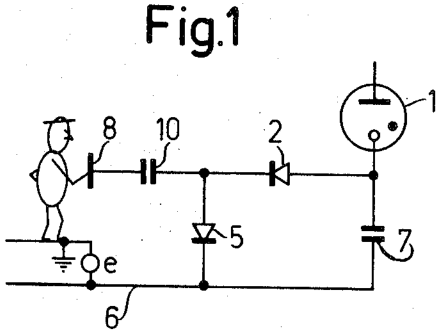
FIG. 2 shows a circuit detail to explain the operation of the arrangement of FIG. 1.

FIG. 2 shows for the sake of clarity the switching elements separately, which are most essential for the ignition of the tube 1. These elements consists of the touch contact 8, the capacitors 7 and 10 and the diodes 5 and 2.

As can be seen these elements constitute a known voltage-doubling rectifier circuit with the exception that the capacitance of the capacitor 10 with which the own capacitance of the operator's body is in series when the contact 8 is touched is considerably lower than that of the charge capacitor 7. During each positive half cycle of the alternating voltage the capacitor 10 is charged through the diode 5, but since the capacitor 10 has a relatively low value its charge is relatively small. During a subsequent negative half cycle, this relatively small charge is fed through the diode 2 to the high-value charge capacitor 7. The voltage across the capacitor 7 thus increases during each cycle by a small amount only (in the negative direction). Unlike normal rectifier circuits which have often a long discharge time constant, but a short charge time constant, the circuit of FIG. 2 has a long charge time constant. This charge time constant is at a minimum equal to T C7 + C10/C10 in which $T$ represents the cycle of the alternating voltage. For $T = 0.02$ sec., $C7 = 10{,}000$ pF and $C10 = 500$ pF the charge time constant is thus 21 periods = 0.42 sec. at a minimum.

Such a long charge time constant is advantageous because large but sporadically occurring discharge perturbations on the touch contact 8 are unable to charge the capacitor 7 to such a high extent that the tube 1 is ignited.

When the touch contact is touched during sufficient alternating voltage cycles, the voltage across the capacitor 7 increases negatively until the tube 1 ignites. The current then flowing through the tube 1 (see FIG. 1) will charge the capacitor 7 in the positive direction in the first instance, but subsequently it will be depleted through the diode 2, the potentiometer 3 and the diode 5 to the negative terminal 6. the current flowing thorugh the tube 1 is then larger then the current which is required to produce a voltage across the potentiometer 3 equal to the voltage (33 Volts) of the stabilizer 12. Part of the tube current thus flows through the diode 11 to the voltage stabilizer 12, and the voltage across the potentiometer 3 is therefore stabilized at substantially the stabilizer voltage.

The tuning voltage which is applied through the blocking diode 16 and the connection 17 to the tuning diodes of the receiver is derived from the preset tap on the potentiometer 3. Furthermore a voltage may be derived from the high end of the potentiometer 3 (see point A) for other purposes, for example, for bringing about the range switching of the receiver through a preadjustable switch.

A circuit arrangement according to FIG. 1, tested in practice, was proportioned as follows.

Supply voltage 14-6 280 Volts.
Tube 1 type ZA 1002, ignition voltage 170 V and operating voltage 109 V.
Stabilizer 12 type TAA 550, 33 V
Resistor 3 100 kOhms
Resistor 9 330 kOhms.
Resistor 15 47 kOhms.
Capacitor 4 INF. 1 NF.
Capacitor 7 10 NF.
Capacitor 10 470 PF.

Figure 3:
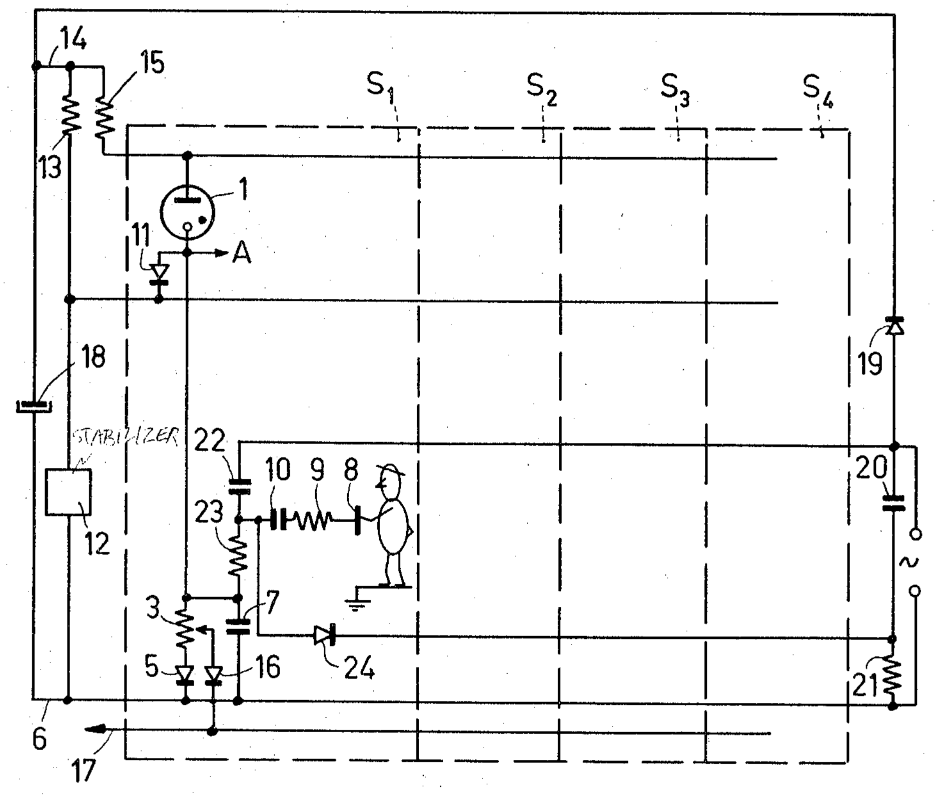
FIG. 3 shows a second embodiment of an arrangement according to the invention and FIG. 4 shows a circuit detail to explain the operation of the arrangement of FIG. 3.

In the embodiment of FIG. 3 corresponding switching elements have the same reference numerals as those in FIG. 1. In the embodiment of FIG. 1 the use of a bridge rectifier (V) is necessary in order to ensure that upon touching the touch contact 8 a mains alternating voltage is always applied through the touch contact. On the other hand a single supply rectifier 19 can be used for the embodiment of FIG. 3.

In this embodiment the mains alternating voltage is applied both to a series arrangement of a capacitor 20 and a resistor 21 which is common for all units, and to a series arrangement of a capacitor 22, a resistor 23 and the charge capacitor 7 present in each unit. The touch contact 8 is connected through the resistor 9 and the capacitor 10 to the connection between the capacitor 22 and the resistor 23. Furthermore this connection is connected through a rectifier diode 24 to the connection between the capacitor 20 and the resistor 21.

Figure 4:
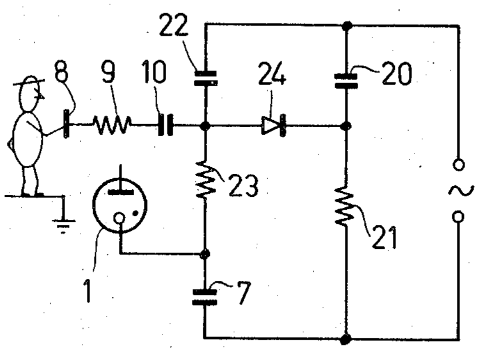

In FIG. 4 the elements 1, 7, 8, 9, 10, 20, 21, 22, 23 and 24 are shown once more for the sake of clarity. The capacitor 7 has such a high value that it constitutes a negligibly small impedance for the mains alternating voltage. The elements 20, 21, 22 and 23 constitute a bridge circuit which is proportioned in such a manner that a bridge balance is present. Consequently, no alternating voltage occurs across the rectifier diode 24, so that neither any rectification is effected.

When the contact 8 is touched, the bridge balance is perturbed due to the impedance which is constituted by the operator's body because always one side of the mains alternating voltage is connected to earth. When the lower side of the mains is connected to earth, this impedance is connected in parallel across the resistor 23 through the elements 9 and 10. However, when the high side of the mains is connected to earth, this impedance is connected in parallel across the capacitor 22 through the elements 9 and 10. Hence, independent of the manner in which the arrangement is connected to the mains a perturbation of the bridge balance always occurs when the contact 8 is touched.

The alternating voltage which as a result thereof occurs across the diode 22 is rectified by this diode so that the capacitor 7 is charged in the negative direction and hence initiates the ignition of the tube 1.

The proportioning may be chosen to be, for example, as follows:

| | |
|---|---|
| Capacitor 7 – 20 | 10 NF |
| Capacitor 10 | 470 PF |
| Capacitor 22 | 100 PF |
| Resistor 9 – 21 | 330 KOhms. |
| Resistor 23 | 33 MOhms. |

Due to the rectifying action of the diode 24 the capacitor 22 is firstly negatively charged through this diode and subsequently this negative charge is shifted through the resistor 23 to the charge capacitor 7. The charge time constant for charging the capacitor 7 is then long relative to the cycle of the alternating voltage, which is predominantly due to the fact that during each cycle only a small quantity of charge from the capacitor 22 having a relatively low value is shifted to the capacitor 7 having a relatively high value.

It is to be noted that unlike FIG. 1 the diode 5 in FIG. 3 does not have any rectifying function. This diode has, however, been maintained in connection with its temperature-compensating action in order to render the voltage applied through lead 17 to the variable capacity diodes as much as possible independent of temperature variations.

When V12 is the stabilized voltage supplied by the stabilizer 12, the voltage V12 + Vd11 is present at the high end of the potentiometer 3 when the tube 1 conducts, while the voltage Vd5 is present at the low side of the potentiometer. Consequently, the voltage V12 +0 Vd11 − Vd5 is present across the potentiometer. A fraction $\alpha$ of this voltage, hence $\alpha$ (V12 + Vd11 − Vd5) is thus present between the tap of the potentiometer and its low end and consequently $\alpha$ (V12 + Vd11 − Vd5) +Vd5 is present between the tap and the negative supply terminal 6. This voltage is decreased by Vd16 by the diode 16, so that the voltage $$\alpha\ (V12 + Vd11 - Vd5) + Vd5 - Vd16$$

occurs across the connection 17 relative to the negative terminal 6. When diodes of the same type are chosen for 11, 5 and 16, their greatly temperaturedependent pass voltages Vd11, Vd5 and Vd16 are mutually equal so that the voltage across the connection 17 becomes equal to $\alpha$ V12, hence only dependent on the voltage V12 provided by the stabilizer and on the position of the potentiometer $\alpha$.

What is claimed is:

1. An electronic switching arrangement having a touch contact, a bistable switching element having an input, a coupling between the touch contact and said input, and an alternating voltage source which is activated when the touch contact is touched for switching over the switching element, characterized in that the said coupling comprises a rectifier circuit for rectifying the alternating voltage and successively a series capacitor, a parallel rectifier element, a series impedance, and a charge capacitor, and said series capacitor has a value which is at least several times lower than that of the charge capacitor, and that the charge time constant of the rectifier circuit is essentially longer than one cycle of the alternating voltage.

2. An electronic switching arrangement as claimed in claim 1, characterized in that the said series impedance is constituted by a second rectifier element.

3. An electronic switching arrangement as claimed in claim 1, characterized in that said input of the bistable switching element also forms part of the main current path of the switching element and that at least part of the direct current of the switching element flows through the series impedance and the parallel rectifier of the rectifier circuit.

4. An electronic switching arrangement as claimed in claim 1, characterized in that the rectifier circuit comprises a bridge circuit of impedances having first and second diagonals, means to apply said alternating voltage to the first diagonal, means to rectify said alternating voltage in the second diagonal and means to connect the touch contact to an angular point of the second diagonal for unbalancing the bridge circuit when the contact is touched.

5. An electronic switching arrangement as claimed in claim 4, characterized in that one of the branches of the bridge circuit comprises the said series impedance and the said charge capacitor of the rectifier circuit.

* * * * *